United States Patent

Hoss

[15] 3,700,967
[45] Oct. 24, 1972

[54] GROUND FAULT DETECTOR CIRCUIT
[72] Inventor: Robert J. Hoss, Plano, Tex.
[73] Assignee: Zinsco Electrical Products, Los Angeles, Calif.
[22] Filed: Jan. 10, 1972
[21] Appl. No.: 216,526

[52] U.S. Cl............317/18 D, 317/27 R, 317/33 SC, 323/70, 317/49, 317/53, 323/60
[51] Int. Cl.........................................H02h 3/28
[58] Field of Search.........317/18 D, 53, 27 R, 33 SC, 317/49; 323/60, 70

[56] References Cited

UNITED STATES PATENTS

| | | | |
|---|---|---|---|
| 2,957,122 | 10/1960 | Manteuffel | 323/70 |
| 3,512,045 | 5/1970 | Tipton et al. | 317/18 D |
| 3,597,656 | 8/1971 | Douglas | 317/18 D |
| 3,611,035 | 10/1971 | Douglas | 317/18 D |

*Primary Examiner*—James D. Trammell
*Attorney*—Ford W. Harris, Jr. et al.

[57] ABSTRACT

A ground fault detector providing protection from leakage current to ground by sensing unbalance in supply and neutral conductor currents to actuate a circuit breaker. A solid state circuit including amplifier and detector and having the unbalance signal of a current transformer as an input for energizing a trip coil of the breaker when the unbalance current exceeds a predetermined level. Improved circuitry providing temperature compensation, insensitivity to turn on and other transients and noise, and protection against overheating due to breaker hang-up.

19 Claims, 4 Drawing Figures

PATENTED OCT 24 1972 3,700,967
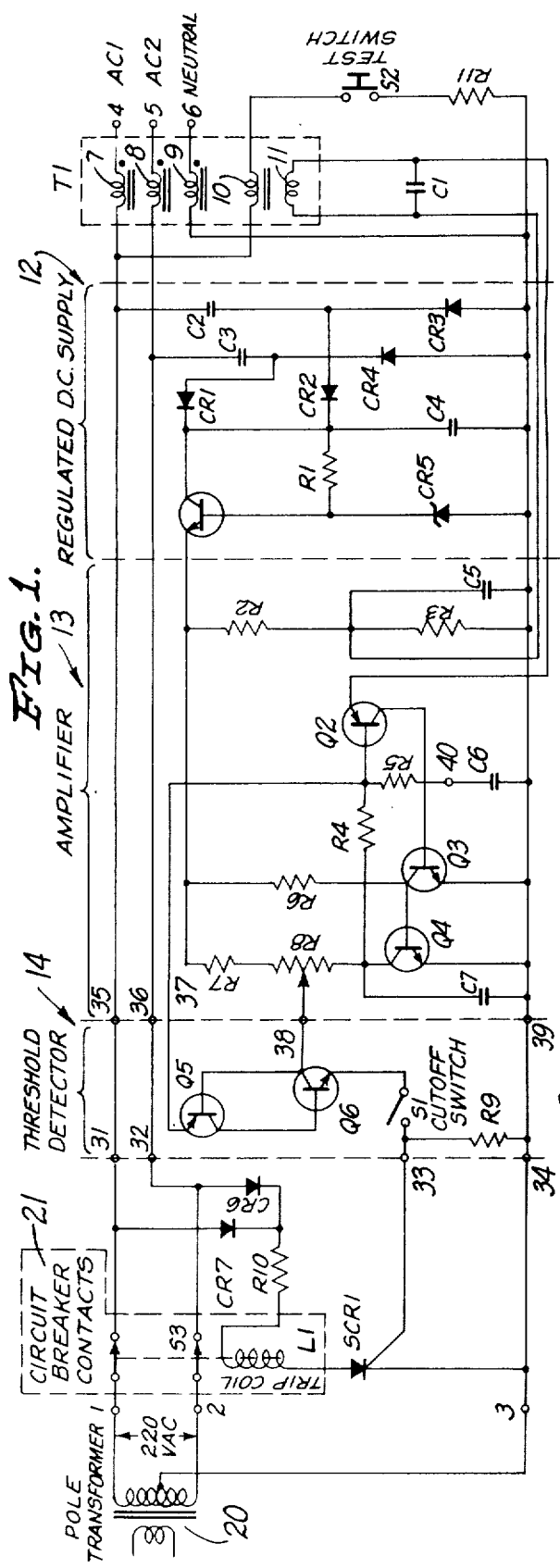
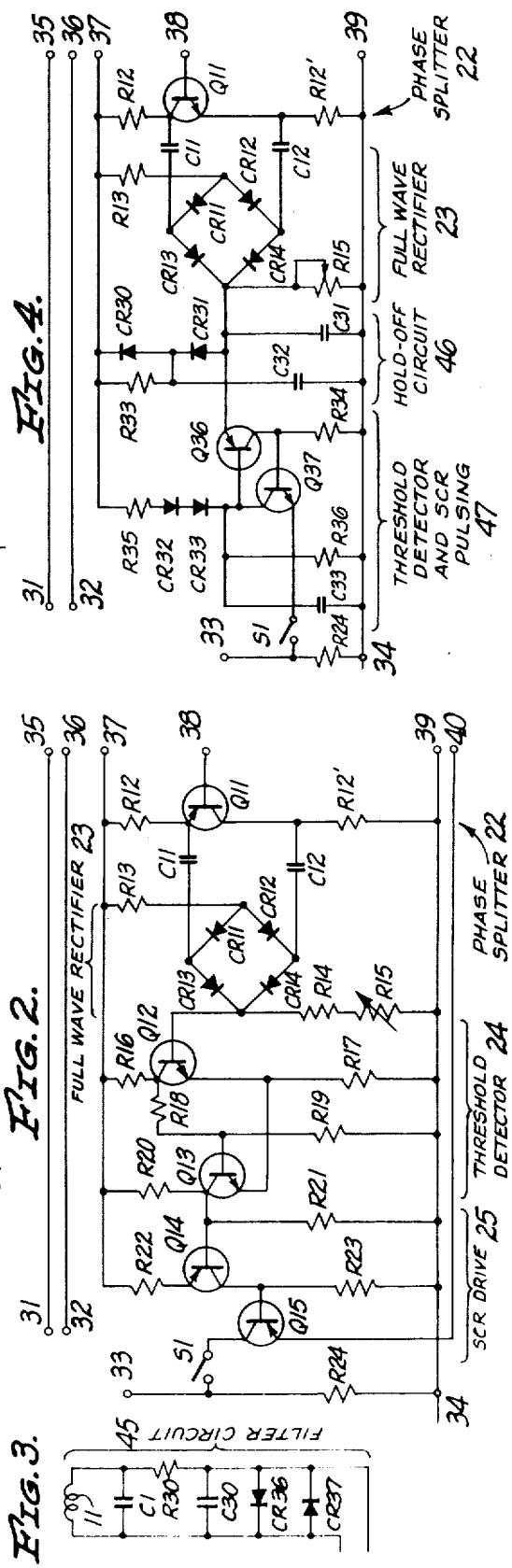

GROUND FAULT DETECTOR CIRCUIT

BACKGROUND OF THE INVENTION

This invention relates to a detector for ground faults in electrical installations and more specifically, to a new and improved ground leakage current detector for protecting personnel by tripping a circuit breaker when a leakage current to ground exceeds a predetermined value. Ground fault detectors have been in use for some time and typically include some means such as a current transformer for detecting the presence of a ground fault current, and some means for actuating a circuit breaker when the fault current exceeds some preset value. Typical prior art devices are shown in the U.S. Pats. to Schweitzer No. 2,238,570, Adamson No. 2,977,510, and Dalziel No. 3,213,321, and British Pat. No. 446,299.

A present day ground fault detector should be small and inexpensive and readily adapted for use with small portable electrical equipment as well as in fixed installations. The detector should be capable of operation to open the main power circuit when a specific small fault current exists and should operate repeatedly within small tolerances. At the same time, the detector should be insensitive to temperature variations, noise and other interference and transients due to power turn on.

SUMMARY OF THE INVENTION

The ground fault detector is operated with a current transformer and a circuit breaker. The current transformer secondary is part of a resonant circuit which provides an unbalance signal to a tuned, high gain, stable amplifier with a.c. and d.c. feedback. A detector circuit actuates a solid state switch to trip the breaker when the amplifier output exceeds a predetermined value. Power for the amplifier and detector is supplied by a regulated power supply capacitively coupled to the power source on the load side of the breaker. The detector circuit is pulsed in order to prevent damage to any of the circuitry in the event of breaker hangup. The ground fault detector may be operated with three wire systems and with two wire systems, and may be operated on one-half cycle of the a.c. source and on either half cycle.

One object of this invention is to provide a circuit for detecting the presence of a current leakage to ground which may be flowing through a human body from the hot side of a 110 VAC or 220 VAC power source to ground. This may be accomplished by a current transformer which senses both the current flowing to the load from a power source and the current returning through the neutral. The current transformer is configured such that the current in the primaries, consisting of the supply conductors and the neutral conductor, subtract with the induced secondary current representing the difference in the current flowing to the load and that returning on the neutral. If any current path to ground is present, the current flowing to the load will be greater than that returning through the neutral conductor, and thus a current will be induced in the secondary winding proportional to the amount of leakage present.

Another object of this invention is to provide a means for increasing the sensitivity of the circuitry to the 60 Hz fault signal while decreasing its sensitivity to frequencies above and below this frequency. This may be accomplished by tuning the amplifier with a resistor capacitor network.

A third object of this invention is to compensate for the output versus temperature characteristics of the current transformer due to the change in core material initial permeability over the wide temperature range in which the ground fault detector must operate. Compensation is achieved by providing a resonant circuit at the secondary winding and choosing the resonance point of the transformer resonant circuit such that the change in inductance with temperature moves the resonant peak in a manner which properly shapes the temperature versus output characteristics of the transformer.

Another object of the invention is to provide for pulsing the magnetic trip coil of the breaker such that the duty cycle of the current pulses to the trip coil is low enough that the coil will not heat sufficiently to cause insulation breakdown or component failure in the event of breaker hang-up and continuation of the fault current.

A further object is to eliminate the possibility of the circuitry activating the breaker when the breaker is initially set due to settling and turn on transients in the electronics.

DESCRIPTION OF THE DRAWING

FIG. 1 is a circuit diagram of a ground fault detector with a three wire system and incorporating one embodiment of the invention;

FIG. 2 is a circuit diagram showing an alternative form of threshold detector for the circuit of FIG. 1, which is operable to actuate the circuit breaker on either the positive or negative going half-cycle of the a.c. source;

FIG. 3 is a circuit diagram showing an alternative arrangement for the transformer secondary; and FIG. 4 is a circuit diagram of another and presently preferred embodiment of the threshold detector with a hold off circuit.

DESCRIPTION OF THE PREFERRED EMBODIMENTS

Ground Fault Detector Employing Single Polarity Fault Signal Detection

In the circuit of FIG. 1, a.c. power is provided from a transformer 20 through a circuit breaker 21 and current transformer T1 to the load terminals 4, 5, 6. The ground fault detector includes a regulated d.c. supply 12, a tuned multistage amplifier 13, a threshold detector 14, and a solid state switch SCR1. A three wire system is illustrated but the detector is equally suitable for use with a two wire system and the circuit of FIG. 1 can be converted to a two wire system by omitting the supply conductor between terminals 2 and 5, and the components associated therewith.

The AC power is supplied at input terminals 1 and 2 and neutral terminal 3. AC power passes through the circuit breaker contacts S3 and is delivered to the load at output terminals 4 and 5. The neutral is continuous from input terminal 3 to output terminal 6.

The fault-sensing device includes current transformer T1 and capacitor C1. The primary windings of T1 consist of the AC load conductors 7 and 8, and the neutral conductor 9, along with a circuit test conductor 10. If the sum of the current through conductors 7 and 8 is greater than the current through neutral conductor 9, representing a fault condition, a current will be induced in secondary winding 11. Also, if test switch S2 is depressed such that a current of a value determined by resistor R11 flows through conductor 10, a current will be induced in secondary winding 11. Capacitor C1 provides a means for resonating the transformer secondary 11 such that the sensitivity of the transformer to the fault current frequency is enhanced while the sensitivity to higher frequencies is reduced. It also provides a means for temperature compensating the change in transformer inductance. The inductance and resistance of secondary 11 and the capacitance of capacitor C1 form a resonant circuit.

The regulated DC power to the solid state circuitry is provided by the regulated supply 12 consisting of capacitors C2, C3 and C4, resistor R1, diodes CR1, CR2, CR3, CR4, zener diode CR5, and transistor Q1. Diodes CR1, CR2, CR3 and CR4 act as a full wave bridge rectifier with conductors 7 and 8 providing the AC power, and neutral conductor 9 acts as the DC ground for the power supply and other circuitry. Capacitors C2 and C3 act as current-limiting devices. The reactive impedance of these capacitors at the AC power source frequency drops the voltage to the full wave rectifier to a convenient lower voltage at which the semiconductor circuitry can operate. Capacitor C4 acts as a filter to remove a majority of the full wave ripple from the bridge rectifier. Zener diode CR5 provides a stable DC voltage reference for circuit operation. It is biased through resistor R1. Transistor Q1 is a series pass transistor which, using CR5 as a reference, regulates the DC output voltage under changes in load conditions and aids in further removing power supply ripple.

The amplifier 13 is composed of transistors Q2, Q3, and Q4, capacitors C5, C6 and C7, and resistors R2, R3, R4, R5, R6, R7, and R8. The fault or unbalance signal from the secondary winding 11 of transformer T1 is presented to the emitter of transistor Q2. The amplifier in turn presents an amplified signal to the threshold detector 14 at the collector of transistor Q4.

The amplifier 13 incorporates both AC and DC feedback, through resistors R4 and R5 and capacitor C6, in order to stabilize both the DC operating point and the AC gain over a wide temperature range. The DC operating point at the collector of transistor Q4 is essentially at the same potential as the DC potential established at the junction of bias resistors R2 and R3, less the base to emitter potential of transistor Q2 and a small drop across resistor R4. This is so since the integrating action of C6 maintains an essentially constant DC potential at the base of Q2.

AC midfrequency gain of the amplifier 13 is established by resistors R4 and R5, which act as a voltage divider to the out-of-phase signal on the collector of transistor Q4. The divided out-of-phase signal is presented to the base of transistor Q2, while the input signal from transformer T1 is presented at the emitter of Q2. The resulting signal amplitude differential results in a constant gain over a wide temperature range.

High frequency noise suppression is provided by rolloff capacitor C7. The combination of resistors R7, R8 and capacitor C7 determines the rolloff frequency. Capacitor C5 provides additional power supply ripple suppression while providing a low impedance signal path from the fault-sensing transformer secondary to signal ground.

The threshold detector 14 consists of transistors Q5 and Q6, resistor R9 and variable resistor R8. Transistors Q5 and Q6 are connected collector-to-base and are normally in the cut-off state. As soon as the potential from the base to emitter of Q5 exceeds its cut-in voltage, current will be supplied to the base of Q6 and it too will begin to conduct, in turn increasing the base to emitter potential of Q5. Thus, regenerative action will occur and both transistors Q5 and Q6 will be rapidly driven into saturation. Current will then flow through resistor R9, presenting a positive voltage to the gate or control element of a solid state switch such as a Triac or a silicon controlled rectifier SCR1.

The threshold voltage, or the base to emitter voltage impressed across transistor Q5, is determined by the difference between the DC potential at the base of Q2 and the DC plus signal potential at the moving arm of variable resistor R8. Since the DC potential between the base of Q2 and collector of Q4 is essentially equivalent, a DC differential or threshold level is obtained by the voltage divider action of variable resistor R8. Adjusting the arm of R8 further away from the collector of Q4 biases the base to emitter junction of Q5. When an AC signal is present at the collector of Q4 and the negative going half cycle is of sufficient amplitude to offset the preset threshold potential, the base to emitter junction of Q5 will be forward biased and Q5 will conduct.

The problem of actuation of the threshold detector by turn-on transients during initial electronic power up (i.e., when the breaker is set), is overcome by connecting the emitter of Q5 to capacitor C6, which slowly charges from a zero potential, and connecting the base of Q5 to the collector resistor of transistor Q4, which rapidly obtains a positive potential at turn-on. This insures that the base-to-emitter junction of transistor Q5 will remain reverse biased during the turn-on and settling time of the electronics.

Tripping of the circuit breaker 21 is accomplished with the switch SCR1, a trip coil L1, resistor R10 and diodes CR6 and CR7. The trip coil L1 may be a coil of wire wound around a pole piece within the circuit breaker mechanism thus forming an electromagnet. When a current flows through this coil, a magnetic field is produced which attracts an armature piece. The motion of this armature towards the pole piece releases the circuit breaker mechanism, in turn opening breaker contacts S3.

Whenever the threshold detector 14 is activated, a positive potential is presented at the gate of switch SCR1. This, in turn, causes SCR1 to conduct, allowing current to flow from the protected AC power source conductors 7 and 8 through diodes CR6 and CR7, resistor R10 and trip coil L1 to the neutral conductor 9. Resistor R10 limits the current to a safe operating value. Diodes CR6 and CR7 allow current to flow during the positive half cycle (with respect to neutral) of either phase of the AC power source.

As soon as the breaker 21 trips, the contact sets S3 open and power to the trip coil and the electronics is disconnected. In the case of a mechanical breaker hang-up, continuous current through the trip coil and SCR1 could potentially cause damage due to excessive heating. For this reason the gate of SCR1 is pulsed at a low duty cycle such that it allows only a single half cycle of current to flow through the trip coil per pulse with a long time delay between pulses (i.e., in the order of one pulse per second). Pulsing of the switch is accomplished by connecting the emitter of Q5 to capacitor C6. As the threshold circuit is activated, transistors Q5 and Q6 are driven into saturation. Current, therefore, flows from C6 through Q5 and into the base of Q6 which has a very low input impedance due to its saturation state. Capacitor C6 is therefore partially discharged causing the output potential of the amplifier at transistor Q4 to immediately rise to power supply potential. This in turn causes the threshold detector to cut off. The result is a short pulse at the gate of the switch SCR1. The detector will remain off until the amplifier again stabilizes. This off period is determined by the charging time of capacitor C6, which is primarily a function of C6 and R4. The pulse width is determined primarily by C6, R5 and R9. The charged capacitor C6 provides the driving current for the regenerative feedback circuit so that the detector remains on for only a short time, and also provides for blocking or maintaining the detector in a nonoperative condition when the system is initially energized while the capacitor is being initially charged, thereby preventing a fault signal due to turn-on transients.

The phase shift of the amplifier preferably is adjusted such as to cause the breaker contact set to open at a point in the a.c. power cycle which minimizes contact arcing time. The number of degrees which the fault signal is shifted with respect to the a.c. power is dependent upon the sum of the phase shifts contributed by the bandpass characteristics of the tuned current transformer and by the tuned amplifier. Phase shift adjustment may be achieved by changing the bandpass characteristics of the amplifier by varying the resistance-capacitance time constants in the feedback network. Desirably the peaks of the a.c. fault signal (and thus the breaker trip point) occur a few degrees before the peaks of the a.c. source supplying trip coil power. Breaker trip at this point in the a.c. power cycle produces contact opening just prior to the zero crossing point of the a.c. power cycle, minimizing arcing time.

Operation of the Circuit Illustrated in FIG. 1

The detector of the invention is primarily intended to protect people from electrical shock although it also may be utilized to protect equipment from damage due to grounding short circuits.

Under normal circumstances, when no ground fault condition occurs, all of the current leaving the AC power conductors 7 and 8 will return through the neutral conductor 9. The sum of the currents flowing in the primaries of current transformer T1 will therefore be zero, and no current will be induced in the secondary. When a fault condition occurs such that a fault current flows from one or both of the AC power conductors to ground through a person or some other vehicle, the sum of the currents in the primaries of T1 will not cancel since a portion of the current flowing to the load in conductors 7 or 8 is not returning via the neutral 9. The resultant current differential will induce a current in the secondary of T1 of a magnitude proportional to the fault current. This fault current or unbalance signal is then amplified by transistors Q2, Q3, and Q4. If the amplified unbalance signal is of magnitude greater than that of the threshold value set at adjustable resistor R8, the threshold detector with transistors Q5 and Q6 will be activated. This in turn will present a positive voltage to the gate of the switch SCR1 which will then conduct, for at least one half cycle, allowing current to flow through trip coil L1. The magnetic field produced by the current flow in L1 will then trip the breaker. Once the breaker contacts have opened, power to the load and to the electronics and trip coil L1 will be discontinued.

In order to provide a capability of disabling the electronics for any reason, On-Off Switch S1 is provided. When this switch is opened, no current will flow in resistor R9 when the threshold detector is activated; and, therefore, the gate potential of SCR1 will remain at zero. The switch will never conduct under this condition.

A test switch S2 is provided such that the electronics may be functionally checked periodically under simulated fault conditions. When S2 is depressed, current from AC power conductor 7 will flow through transformer T1, primary conductor 10 and through resistor R11 to ground. R11 is chosen such that the current in primary conductor 10 is equivalent to the fault current required to activate the threshold detection circuitry. When S2 is depressed, the current flowing in primary conductor 10 will induce a current in the secondary winding of T1. This fault test signal will then activate the electronics and trip the circuit breaker in the same manner as previously described for a normal fault condition.

Ground Fault Detector Employing Double Polarity Fault Signal Detection

FIG. 2 illustrates an alternative form for the threshold detector 14 of FIG. 1. The threshold detector of FIG. 2 may be inserted into the circuit of FIG. 1 at terminals 31–40 in lieu of the detector 14 to provide double phase detection increasing the speed of fault current detection. Resistor R8 may be omitted, with the base of transistor Q11 connected directly to the collector of transistor Q4.

The double phase detector of FIG. 2 differs from the threshold detector shown in FIG. 1 in that it rectifies the 60 Hz AC fault signal and as such activates as soon as either the positive or negative half cycle of the unbalance or fault signal reaches the predetermined threshold level. The detector 14 in FIG. 1 is activated only as soon as the negative half cycle of the fault signal reaches threshold amplitude. In this way the double phase detection can react at least 8 msec. faster than the single phase detection of the circuit of FIG. 1.

The detector circuit of FIG. 2 consists of a phase splitter 22, a fullwave rectifier 23, a Schmitt trigger threshold detection circuit 24, and an SCR driver stage 25. The phase splitter 22 consists of transistor Q11 and resistors R12 and R12'. The amplified fault signal is presented to the base of Q11. Resistors R12 and R12' are chosen such that the AC waveform at the emitter and collector of transistor Q11 are of equal amplitude and 180° out of phase. These two waveforms are then coupled to the rectifier 23 through capacitors C11 and C12. Diodes CR11 through CR14 and Resistors R13, R14 and R15 constitute a full wave rectifier. Resistor R13 forms a voltage divider with R14 and R15 such that all diodes are conducting when no AC signal is applied. The DC potential at the base of transistor Q12 is adjusted with variable resistor R15. When an AC signal is present at the base of Q11, it will be presented to the diode bridge as a signal of equal amplitude but of opposite polarity. The positive going signal will cut its respective diodes off while the negative going signal will increase conduction of its respective diodes. This action results in a full wave rectified, positive AC fault signal riding on an adjustable DC level.

The rectified unbalance signal is then presented to the threshold detection circuit (Schmitt trigger) 24, consisting of transistors Q12 and Q13, resistors R16, R17, R18, R19 and R20. When the signal at the base of Q12 is below threshold value, Q12 is cut off and Q13 is in its normal active region. Resistors R16, R18 and R19 form a voltage divider which determine the base potential of Q13 and as such the emitter potential of Q13, which is equivalent to the emitter potential of Q12, establishes the threshold potential at which the circuit will operate. When the signal potential at the base of Q12 increases beyond the potential of the emitter plus a small cut-in voltage, Q12 will conduct lowering the base potential of Q13. Transistor Q13 will cut off and the lowering of its emitter potential will drive Q12 into saturation. The regenerative effect insures a rapid response to a signal which is greater than the preset threshold level. The threshold level is adjusted by increasing or decreasing the resistance of variable resistor R15. This raises or lowers the DC potential upon which the rectified AC signal is riding.

The SCR driver stage 25 consists of transistors Q14 and Q15 and resistors R21, R22, R23 and R24. Transistor Q14 is an inverting amplifier whose gain is determined by the ratio of R22 and R23. When the Schmitt trigger is in its stable state (untriggered), the potential at the collector of Q13 drives the potential at the collector of Q14 a few volts above the voltage at the emitter of Q15. This holds Q15 in cut-off and thus maintains the gate potential of the switch SCR1 at zero. When the Schmitt trigger is tripped, the collector voltage of Q13 increases to a point as determined by the voltage divider R20 and R21. This drives the collector potential of Q14 a few volts below the potential of the emitter of Q15 (not to zero volts). Transistor Q15 then conducts discharging the large feedback capacitor in the amplifier. The resultant current through R24 increases the SCR gate potential and causes switch conduction. This in turn causes the circuit breaker to trip as previously explained in conjunction with FIG. 1.

Since the current to drive the SCR control gate comes from a capacitor discharging, it will only last for a short period of time as determined by the capacitor C6 and resistor R24. This action results in a short pulse of current flowing in the SCR1. This provision is made in case of a mechanical breaker hand-up whereby continuous current would flow through the trip coil causing excessive heating. The time duration between pulses is dependent on the resetting time of the amplifier, which is a second or so.

The SCR driver stage 25 also eliminates the possibility of SCR tripping during initial power-up due to turn-on transients. At initial turn-on the potential of the feedback capacitor C6 in the amplifier 13, and thus the emitter of transistor Q14 remains very low during the turn on transient period. Although Schmitt trigger tripping may occur during this period, the voltage at the base of Q15 will never go below the emitter potential of Q15 and thus Q15 will remain cut off.

Operation of the Circuit Illustrated in FIG. 2

When a fault current is present, because of a person being shocked or some other reason, it will be sensed by the current transformer I1 and amplified as explained in conjunction with FIG. 1. The amplified AC signal will then be presented to the input of the double phase detection circuit of FIG. 2. The signal will be full wave rectified by the action of the phase splitter 22 and the bridge rectifier 23. The full wave rectified signal will appear at the base of Schmitt trigger transistor Q12, riding on a DC potential which is adjustable with R15. If the potential of the AC signal positive peaks plus the adjusted DC level on which it is riding is greater than the threshold level established by the resistive divider within the Schmitt trigger, the Schmitt trigger will switch to its on state. The voltage excursion of the collector of Q13 is amplified by Q14 and in turn sends the transistor Q15 into conduction. When this occurs, a positive potential will appear at the gate of SCR1 driving it into conduction, in turn activating the circuit breaker trip mechanism.

Alternative Embodiment of Ground Fault Detector Employing Double Polarity Fault Signal Detection FIGS. 3 and 4 illustrate another and presently preferred embodiment of a ground fault interrupter utilizing double polarity fault signal detection. The filter circuit 45 may be inserted between the capacitor C1 and transistor Q2 of FIG. 1. The circuit of FIG. 4 may be inserted into the circuit of FIG. 1 at terminals 31–40 in the same manner as the circuit of FIG. 2. The circuit of FIG. 4 includes the phase splitter 22, the full wave rectifier 23, a hold off circuit 46, and a threshold detector and SCR pulsing circuit 47.

The circuit of FIGS. 3 and 4 differs from the circuits in FIGS. 1 and 2 in that it is designed for greater noise immunity and for better operation under high fault current conditions. In essence, this circuit combines the amplifier and regenerative feedback circuit illustrated in FIG. 1 with the phase splitter circuitry in FIG. 2 in order to achieve a double polarity fault detection circuit with less transistors and improved operation characteristics. Components corresponding to those of FIGS. 1 and 2 are identified by the same reference numerals.

In the filter circuit 45 (FIG. 3), capacitor C30 and resistor R30 provide a means for resonating the secondary 11 of transformer T1 such that the sensitivity of the transformer to the fault current frequency is enhanced while the sensitivity to higher frequencies is reduced. They also provide a means for temperature compensating the change in transformer inductance. Capacitor C30 determines the resonant frequency and resistor R30 determines the response time of the torrid transformer T1. Capacitor C1 is added for additional filtering of high current switching transients. Diodes CR36 and CR37 provide high voltage transient protection to the input of the amplifier.

The threshold detector 47 includes transistors Q36 and Q37, resistors R34, R35, R36 and diodes CR 32 and CR33. Transistors Q36 and Q37 are connected to collector-to-base and are normally in the cut-off state. As soon as the potential from the base to emitter of Q36 exceeds its cut-in voltage, current will be supplied to the base of Q37; and it too will begin to conduct, in turn increasing the base to emitter potential of Q36. Thus, regenerative action will occur and both transistors Q36 and Q37 will be rapidly driven into saturation. Current will then flow through resistor R24, presenting a positive voltage to the gate of SCR1.

The threshold voltage, or the base-to-emitter voltage impressed across transistor Q36, is determined by the difference between the DC potential at the base of Q36 and the DC plus signal potential at the junction of the full wave rectifier and the variable resistor R15. The DC potential at the base of Q36 is determined by the divider action of R35 and R36 and by the voltage drop across temperature compensation diodes CR32 and CR33. Adjusting the armature of resistor R15 biases the base-to-emitter junction of Q36 below threshold voltage. When an AC signal is present at the output of the rectifier and the positive going half cycle is of sufficient amplitude to offset the preset threshold potential, the base-to-emitter junction of Q36 will be forward biased and Q36 will conduct. Capacitors C31 and C33 provide filtering for the prevention of nuisance tripping from transient pick-up within the circuitry.

The hold-off circuit 46 prevents actuation of the threshold detector due to turn-on transients during initial electronics power up, i.e., when the breaker is set. The emitter of Q36 is connected to capacitor C32, through diode CR31. Capacitor C32 slowly charges through resistor R33 from a zero potential at power up, insuring that the base-to-emitter junction of Q36 will remain reverse biased during the turn-on and settling time of the electronics.

The hold-off circuit 46 differs from that in FIGS. 1 and 2 in that it is separate from the amplifier. This is done so that the hold-off and trigger operation of the threshold detector is not affected by the operation of the amplifier which can become saturated by large fault currents and thus cause a threshold detector malfunction. In the configuration of FIG. 4 threshold and SCR pulsing action is maintained regardless of fault current magnitude.

Pulsing of the switch SCR1 is accomplished by connection of the emitter of Q36 to capacitors C11 and C12 through the rectifier. As the threshold circuit is activated, Q36 and Q37 are driven into saturation. Current, therefore, flows from C11 and C12 through Q36 and into the base of Q37 which has a very low input impedance due to its saturation state. Capacitors C11 and C12 are thus discharged. This in turn causes the threshold detection circuitry to cut off. The result is a short pulse at the gate of SCR1. The threshold circuitry will remain off until C11 and C12 fully charge. This off period is determined by the charging time of C11 and C12 through R13. The pulse width is determined primarily by C11, C12, R24 and the gate impedance of SCR1.

The operation of the circuit of FIGS. 3 and 4 corresponds to that of the circuits of FIGS. 1 and 2.

I claim:

1. In a ground fault detector for operation with a circuit breaker, a current transformer, and an a.c. power source with at least one supply conductor and a neutral or return conductor,
    with the supply conductor connected through a breaker contact set to a transformer primary winding and with the neutral conductor connected to another transformer primary winding, and with the transformer secondary winding providing an unbalance signal when there is an unbalance in the currents in the supply conductor and the neutral conductor,
    the improvement comprising in combination:
    amplifier means having an input and an output;
    circuit means for connecting said transformer secondary to said amplifier input for amplifying said unbalance signal;
    detector means having said amplifier output as an input for detecting when said amplifier output exceeds a predetermined value and producing a control signal;
    trip means having said control signal for an input for actuating said circuit breaker and opening said contact set;
    a d.c. power supply for said amplifier means and detector means;
    said detector means including a first transistor switched into conduction when said amplifier output exceeds said predetermined value, and
    said amplifier means including a first capacitor charged from said d.c. supply through a first resistor; and
    circuit means interconnecting said first capacitor and first transistor for discharging said first capacitor through the conducting first transistor, with the discharged capacitor reducing the amplifier output to cut off said first transistor and provide a control signal pulse,
    with the pulse duration being a function of the capacitor discharge time and with the interpulse interval being a function of the capacitor charge time.

2. A ground fault detector as defined in claim 1 wherein said circuit means for connecting said transformer includes a second capacitor connected across said secondary winding forming a resonant circuit, said second capacitor having a capacitance to resonate with said secondary winding at a frequency in the order of that of the a.c. source, with the change of inductance of the secondary winding with change in temperature shifting the resonant frequency of the resonant circuit maintaining the secondary winding output substantially constant as the initial permeability of the transformer core material changes with change in temperature.

3. A ground fault detector as defined in claim 2 wherein said amplifier means includes
    a multistage negative feedback amplifier having a second transistor in one stage and a third transistor in a succeeding stage, with the signal to be amplified connected through the collector and emitter of said second transistor to the next stage, and
    means defining an a.c. feedback path from the output of said third transistor to the base of said second transistor providing a signal out-of-phase with the signal to be amplified, and means defining a d.c. feedback path comprising a third capacitor connected between said second transistor base and circuit ground providing a substantially constant d.c. potential at said second transistor base.

4. A ground fault detector as defined in claim 3 including means for reverse biasing said first transistor during power build-up after said power supply is energized and having a resistive circuit in an output stage of said amplifier connected to the base of said first transistor, with build-up at said base preceding build-up at said first capacitor.

5. A ground fault detector as defined in claim 3 including a third capacitor connecting the input of said d.c. power supply to the a.c. power source conductor on the load side of the circuit breaker.

6. A ground fault detector as defined in claim 3 wherein the circuit breaker has a magnetic trip mechanism with a magnetic armature, and said trip means includes a coil of wire wound around said armature and a solid state switch connected to the a.c. power source in series with said coil, with said switch actuated by said control signal of said detector means.

7. In a ground fault detector for operation with a circuit breaker, a current transformer, and an a.c. power source with at least one supply conductor and a neutral or return conductor,
   with the supply conductor connected through a breaker contact set to a transformer primary winding and with the neutral conductor connected to another transformer primary winding, and with the transformer secondary winding providing an unbalance signal when there is an unbalance in the currents in the supply conductor and the neutral conductor,
the improvement comprising in combination:
amplifier means having an input and an output;
circuit means for connecting said transformer secondary to said amplifier input for amplifying said unbalance signal,
   including a first capacitor connected across said secondary winding forming a resonant circuit, said capacitor having a capacitance to resonate with said secondary winding at a frequency in the order of that of the a.c. source, with the change of inductance of the secondary winding with change in temperature shifting the resonant frequency of the resonant circuit maintaining the secondary winding output substantially constant as the initial permeability of the transformer core material changes with change in temperature;
detector means having said amplifier output as an input for detecting when said amplifier output exceeds a predetermined value and producing a control signal; and
trip means having said control signal for an input for actuating said circuit breaker and opening said contact set.

8. A ground fault detector as defined in claim 7 wherein said amplifier means includes
   a multistage negative feedback amplifier having a first transistor in one stage and a second transistor in a succeeding stage, with the signal to be amplified connected through the collector and emitter of said first transistor to the next stage, and
   means defining an a.c. feedback path from the output of said second transistor to the base of said first transistor providing a signal out-of-phase with the signal to be amplified, and
   means defining a d.c. feedback path comprising a second capacitor connected between said first transistor base and circuit ground providing a substantially constant d.c. potential at said first transistor base.

9. In a ground fault detector for operation with a circuit breaker, a current transformer, and an a.c. power source with at least one supply conductor and a neutral or return conductor,
   with the supply conductor connected through a breaker contact set to a transformer primary winding and with the neutral conductor connected to another transformer primary winding, and with the transformer secondary winding providing an unbalance signal when there is an unbalance in the currents in the supply conductor and the neutral conductor,
the improvement comprising in combination:
amplifier means having an input and an output;
circuit means for connecting said transformer secondary to said amplifier input for amplifying said unbalance signal;
detector means having said amplifier output as an input for detecting when said amplifier output exceeds a predetermined value and producing a control signal; and
trip means having said control signal for an input for actuating said circuit breaker and opening said contact set;
said amplifier means including a multistage negative feedback amplifier having a first transistor in one stage and a second transistor in a succeeding stage, with the signal to be amplified connected through the collector and emitter of said first transistor to the next stage, and
means defining an a.c. feedback path from the output of said second transistor to the base of said first transistor providing a signal out-of-phase with the signal to be amplified, and
means defining a d.c. feedback path comprising a first capacitor connected between said first transistor base and circuit ground providing a substantially constant d.c. potential at said first transistor base.

10. A ground fault detector as defined in claim 9 wherein said detector means includes a third transistor switched into conduction when said amplifier output exceeds said predetermined value, and
   said amplifier means includes a second capacitor charged from said d.c. supply through a first resistor; and
   circuit means interconnecting said second capacitor and third transistor for discharging said second capacitor through the conducting third transistor, with the discharged capacitor reducing the amplifier output to cut off said third transistor and provide a control signal pulse,
   with the pulse duration being a function of the capacitor discharge time and with the interpulse interval being a function of the capacitor charge time.

11. In a ground fault detector circuit for operation with a circuit breaker, a current transformer, and an a.c. power source with at least one supply conductor and a neutral or return conductor,
with the supply conductor connected through a breaker contact set to a transformer primary winding and with the neutral conductor connected to another transformer primary winding, and with the transformer secondary winding providing an unbalance signal when there is an unbalance in the currents in the supply conductor and the neutral conductor,
the improvement comprising in combination:
amplifier means having an input and an output;
circuit means for connecting said transformer secondary to said amplifier input for amplifying said unbalance signal;
detector means having said amplifier output as an input for detecting when said amplifier output exceeds a predetermined value and producing a control signal;
trip means having said control signal for an input for actuating said circuit breaker and opening said contact set;
means for desensitizing the circuit to unwanted transients which may be detected as an unbalance signal;
means for pulsing the trip means to limit heat generation in the breaker coil and associated electronics; and
means for suppressing electronics turn-on transients which may be detected as an unbalance signal.

12. A ground fault detector circuit as defined in claim 11 wherein said means for suppressing includes a resistor-capacitor network for tuning said amplifier means to have a passband at the frequency of the a.c. power source.

13. A ground fault detector circuit as defined in claim 11 wherein:
said trip means includes a solid state switch having a control element;
said detector means includes a DC level adjustment and a regenerative feedback circuit for driving said switch control element;
with said DC level adjustment located at the output of said amplifier means so that the AC signal at the amplifier output is impressed on a variable DC potential; and
with said regenerative feedback circuit in a cut-off state until the sum of said AC signal and said DC potential upon which the AC signal is impressed is greater than said predetermined value, at which time said regenerative feedback circuit will conduct providing current to said control element.

14. A ground fault detector circuit as defined in claim 13 including a d.c. power source, and
wherein said regenerative feedback circuit includes a capacitor charged from said d.c. source and discharged into said detector means, with said capacitor providing the driving current for said feedback circuit; and
with said capacitor comprising said means for suppressing transients by blocking said detector means operation during initial charging of said capacitor.

15. A ground fault detector circuit as defined in claim 11 wherein:
said detector means includes a phase emitter, a diode rectifier, a DC level adjustment, and a threshold sensing circuit;
with said phase splitter coupled to said diode rectifier such that the AC signal at the input of the phase splitter is full wave rectified at the output of the diode rectifier;
with said DC level adjustment connected to the output of the diode rectifier such that the full wave rectified AC signal is impressed on a variable DC voltage;
with said threshold sensing device comprising a Schmitt trigger or unijunction or other bistable or mono-stable, circuit which is activated when the sum of the DC potential and rectified AC potential reaches said predetermined value.

16. A ground fault detector circuit as defined in claim 11 including means for adjusting the phase shift of said amplifier means such that the peaks of the control signal occur a few degrees before the peaks of the AC power cycle supplying the trip means power for causing the circuit breaker contact set to open just prior to the zero crossing point of the AC power cycle minimizing contact arcing time.

17. A ground fault detector as defined in claim 11 wherein said means for desensitizing comprises a filter network of first and second capacitors and a resistor, with said first capacitor connected across the transformer secondary winding, and with one terminal of said second capacitor connected to one terminal of the secondary winding and the other terminal of said second capacitor connected to said resistor which is connected to the other terminal of the secondary winding, whereby said second capacitor and resistor and the transformer inductance determine the response frequency and bandwidth of the filter network, with the output of said filter network appearing at the terminals of said second capacitor.

18. A ground fault detector as defined in claim 1 wherein said circuit means interconnecting said first capacitor and first transistor includes a rectifier with its output connected to said first transistor, and a phase splitter driven by the amplifier output and connected to said rectifier as an input.

19. A ground fault detector as defined in claim 18 including an additional capacitor connected between the input of said detector means and circuit ground and connected to said d.c. power supply through an additional resistor for charging when the detector is energized for holding said detector means in an off-state for a few seconds while transients subside.

* * * * *